US 7,461,970 B2

(12) United States Patent
Brown

(10) Patent No.: US 7,461,970 B2
(45) Date of Patent: Dec. 9, 2008

(54) MIXER AND METHOD OF MIXING

(75) Inventor: Christopher Brown, Glossop (GB)

(73) Assignee: Watson Brown HSM Ltd, Glossop (GB)

( * ) Notice: Subject to any disclaimer, the term of this patent is extended or adjusted under 35 U.S.C. 154(b) by 379 days.

(21) Appl. No.: 10/503,566

(22) PCT Filed: Dec. 9, 2002

(86) PCT No.: PCT/GB02/05586

§ 371 (c)(1),
(2), (4) Date: Mar. 30, 2005

(87) PCT Pub. No.: WO03/064129

PCT Pub. Date: Aug. 7, 2003

(65) Prior Publication Data
US 2005/0169101 A1 Aug. 4, 2005

(30) Foreign Application Priority Data
Jan. 30, 2002 (GB) ................................ 0202065.9

(51) Int. Cl.
*B01F 7/16* (2006.01)
(52) U.S. Cl. ................. 366/189; 366/192; 366/193; 366/194; 366/196; 366/305; 241/199.12; 241/257.1
(58) Field of Classification Search ................ 366/192, 366/193, 296, 302, 305, 306, 189, 194–196; 241/199.12, 220, 253, 257.1, 261.1
See application file for complete search history.

(56) References Cited
U.S. PATENT DOCUMENTS

| 19,093 | A | * | 1/1858 | Leonard | 241/257.1 |
|---|---|---|---|---|---|
| 22,384 | A | * | 12/1858 | Speight | 241/253 |
| 28,681 | A | * | 6/1860 | Moore | 241/257.1 |
| 112,080 | A | * | 2/1871 | Selsor | 241/259 |
| 198,764 | A | * | 1/1878 | Ebaugh | 241/187 |
| 443,295 | A | * | 12/1890 | Poulin | 241/253 |
| 515,571 | A | * | 2/1894 | Burgess | 366/192 |
| 1,101,199 | A | * | 6/1914 | Legg et al. | 366/194 |
| 1,791,169 | A | * | 2/1931 | Schuchardt | 366/192 |
| 2,847,195 | A | | 8/1958 | Bean | 366/191 |
| 2,851,257 | A | * | 9/1958 | Morgan | 366/195 |

(Continued)

FOREIGN PATENT DOCUMENTS

CH 355771 10/1956

(Continued)

Primary Examiner—David L Sorkin
(74) Attorney, Agent, or Firm—Koppel, Patrick, Heybl & Dawson; Michael J. Ram

(57) ABSTRACT

A mixing apparatus comprises first and second opposing mixing members rotatable relative to one another about an axis and which have facing surfaces which extend away from the axis and which define a mixing chamber therebetween. Means are provided for rotating at least one of the mixing members to provide relative rotation between the first and second mixing members in a first rotational direction. An array of mixing formations on at least one of said surfaces interact to mix material within the mixing chamber and are configured to propel material within the mixing chamber towards the axis. The number of mixing formations on at least one of the surfaces increases with radial distance from the axis.

38 Claims, 7 Drawing Sheets

U.S. PATENT DOCUMENTS

| | | | |
|---|---|---|---|
| 2,893,708 A * | 7/1959 | Penberthy et al. | 366/305 |
| 4,657,400 A | 4/1987 | Suehisa et al. | 366/144 |
| 5,411,216 A | 5/1995 | O'Keefe | 241/24 |
| 5,665,796 A | 9/1997 | Hosokawa et al. | 523/322 |
| 5,975,440 A | 11/1999 | Watson | 241/18 |

FOREIGN PATENT DOCUMENTS

| | | |
|---|---|---|
| DE | 9410196.5 | 8/1994 |
| DE | 19546848 | 6/1997 |
| FR | 2760978 | 3/1997 |
| GB | 1258111 | 12/1971 |
| GB | 2300129 | 10/1996 |
| JP | 6349239 | 3/1988 |
| SU | 1776196 | 11/1990 |
| WO | WO 0238263 | 5/2002 |

* cited by examiner

MIXER AND METHOD OF MIXING

RELATION APPLICATIONS

This application is related to, and claims priority from, British Patent Application entitled Mixer and Method of Mixing, filed Jan. 30, 2002, application Ser. No. 0202065.9, and Patent Cooperation Treaty entitled Mixer and Method of Mixing, filed Dec. 9, 2002, International Application Number PCT/GB02/05586, which are fully incorporated herein by reference.

The present invention relates to mixing and provides a new mixing apparatus and mixing method. In particular, the present invention relates to high shear mixing. It will be understood that the term "mixing" includes the processing of single materials.

High shear mixing (HSM) is a relatively recent development of mixing technology which can provide extremely high levels of shear and extensional stressing. HSM technology has its basis in the principles of mechanochemistry (essentially inducing chemical reactions in materials solely by application of mechanical forces) and effectively reproduces the controlled shear gap and extensional flow characteristics of conventional cold two-roll milling in a more intensive way. The technology was first proposed by William Watson and is disclosed in his UK patent number 2,300,129. This patent describes both batch and continuous mixers in which mixing takes place between relatively rotating grooved members which shear and split material as the grooves and intervening lands traverse one another. In the batch mixer the grooves are formed on opposing and relatively rotating discs and are arranged so that material is drawn inwardly along the grooves towards the central axis of rotation of the discs. As material moves towards the centre of the mixer the available volume reduces so that the pressure increases with the result that the material wells up away from the disc centre and is thereby re-circulated outwardly. This provides effective distributive mixing in addition to the shear and splitting action.

By appropriate arrangement of the groove size and distribution the properties of the shear, extensional and distributive mixing can be selectively controlled. In particular, the ability to carefully control the degree of stressing provides a mixer ideally suited to mechanochemical mixing. For instance, one important use of such HSM mixers is in the recycling of rubber and similar cross-linked visco-elastic materials. Mechanochemical mixing provides an efficient way of selectively breaking cross-linking bonds to solubilise the material without significant damage to the polymer chains so that a high quality recycled product can be produced from the reclaimed material.

For efficient industrial application of HSM technology it is desirable to provide mixers which can handle large batches of material, for instance of the order of 200 kg. However, simply scaling up the mixer geometry previously proposed by William Watson presents a number of difficulties. For instance, larger batch volumes could be accommodated by simply increasing the radius of the relatively rotating mixing discs. A problem with this approach is that the number of grooves and their intermediate lands do not vary with respect to radius, with the result that the intensity and frequency of the mixing stresses applied to the material between the discs do vary with the radius. Whilst differences in mixing stresses applied to materials at different locations within the mixer may not be a problem for smaller mixers, as the size of the mixer increases the differences in the extremes of mixing achieved also increases, Furthermore, for larger discs the difference in rotational speed can be significant between inner and outer regions of the discs so that speeds required to achieve adequate mixing at the centre of the disc can result in undesirably high speeds towards the periphery of the discs which can over stress the material.

As an alternative to increasing disc diameter, larger volumes of material could be accommodated by increasing the depth of the grooves in the mixing discs. However, as the depth of the grooves is increased there is an increasing likelihood of some material becoming trapped and stagnating in the bottom of the grooves.

A further practical problem associated with mixing larger batches of material is encountered in removing the mixed material from the mixer. For instance, when using mixers having the previously proposed HSM geometry to recycle rubber compounds, the resultant material is in an extremely viscous "slab" which must be lifted out of the mixer. Whilst this is not particularly problematical for smaller batches of material it can be a significant problem for larger batch sizes.

It is an object of the present invention to obviate or mitigate the above problems.

According to a first aspect of the present invention there is provided a mixing apparatus comprising:

first and second opposing mixing members rotatable relative to one another about an axis;

said first and second mixing members having facing surfaces which extend away from the axis and which define a mixing chamber therebetween;

means for rotating at least one of the mixing members to provide relative rotation between the first and second mixing members in a first rotational direction;

an array of mixing formations on at least one of said surfaces which interact to mix material within the mixing chamber and which are configured to provide a net propulsion of material within the mixing chamber towards the axis as the first and second members are relatively rotated in said first rotational direction; and wherein the number of mixing formations on at least one of the surfaces increases with radial distance from the axis.

By relating the number of mixing formations to the radius of the mixing member (or members) it is possible to normalize the mixing actions occurring across the surface.

The mixing formations are preferably indentations such as grooves defined in the or each surface and may have straight or curved side walls and may themselves be straight or curved. Alternatively the mixing formations may be protuberances raised above the or each surface, for instance raised edges which may have straight or curved side walls and may themselves be straight or curved. Embodiments of the invention may include both grooves and protuberances.

To provide the required propulsion (or pumping) of the material it is preferable that at least some of the mixing formations in at least one, and more preferably both, of the surfaces are swept forwards relative to said first rotational direction.

In one preferred embodiment of the invention each mixing formation in said at least one surface (and preferably both surfaces) has a radially inner end and a radially outer end relative to said axis, the inner ends of some of the mixing formations in the or each surface being further away from said axis than other mixing formations within the same surface.

For instance the surface may be divided into two or more sectors, each sector having an array of substantially parallel mixing formations defined therein, the mixing formations of one sector being non-parallel to the mixing formations of at least one other sector. The mixing formations within a particular sector may be substantially parallel to a radial line projected on the respective surface. The surface may additionally, or alternatively, be divided into radially inner and outer regions, each region defining mixing formations which start and finish within that region, wherein radially outer regions have more mixing formations than radially inner regions.

Arrays of grooves patterned as mentioned above have for instance been used in traditional rice mills. More recently such groove patterns have been used in a mixing device disclosed in U.S. Pat. No. 4,657,400. In this device material is mixed between two relatively rotating grooved discs which pump the material to a collecting ring provided around the periphery of the mixing zone.

To further provide the required propulsion of the material in instances in which both surfaces are provided with grooves or raised edges or the like, it is preferable to so arrange the lines of action of the grooves etc in the respective surface so as to intersect one another when viewed in superposition. This arrangement of intersections may furthermore be so arranged as to provide one predominant radial direction of pumping when rotation occurs in one direction and the opposite predominant radial direction of pumping when rotation is reversed. This arrangement may also be so arranged as to provide a cyclical increase and decrease in the instantaneous intensity and even the instantaneous direction of the radial propulsion.

For instance, such an arrangement of intersecting lines of action of the grooves etc may be achieved by arranging the formation patterns in each of the two surfaces of the above-described instance of the present invention as mirror images of one another.

It is a feature of preferred geometries of the present invention in which the mixing formations are grooves, that the total cross-sectional area of the grooves, when measured at any particular radius, increases in proportion to that radius. As a consequence thereof, material moving within a groove is subjected to increasing pressure when such movement is in the direction of decreasing radius and to decreasing pressure when such movement is in the direction of increasing radius. While material is actively pumped towards the axis of the mixer by means of the action of the grooves, it is at the same time thereby subjected to an increasing pressure that would reverse its direction—the so-called backflow phenomenon that is well known in extruder design. As a consequence either one or both of the cyclically fluctuating intensity of the groove pumping action and the non-uniformity of the movement of material across the cross-section of any particular groove, material is capable of flowing radially inward and outward along the groove, either concurrently or sequentially. This bi-directional flow pattern provides for extremely effective distributive mixing in the radial direction. Individual grooves may themselves have a cross-sectional area which increases with radius to enhance the distributive mixing achieved through backflow. For instance the depth and/or width of the grooves may increase with increasing radius.

Whilst the surfaces of the mixing members of the present invention may have a planar geometry, in preferred embodiments one of the surfaces is concave and the other is convex. A conical geometry is particularly preferred but other geometries such as domed or trumpet shaped geometries could be used. Use of such non-planar geometries enables the mixing volume and surface areas to be increased without undesirably large increases in overall surface radius (i.e. the maximum distance of surface from the axis), thus minimizing surface speed and torque requirements for any given mixer capacity.

It is also preferred that an axial portion of at least one of the first and second mixing members is removable to permit discharge of material from the mixing chamber by relative rotation of said first and second mixing members in said first rotational direction. This overcomes the problems of removal of larger mixed material batches experienced with the known mixers mentioned above.

Such an arrangement could also be advantageously applied in otherwise conventional mixers and thus according to a second aspect of the present invention there is provided a mixing apparatus comprising:

first and second opposing mixing members rotatable relative to one another about an axis;

said first and second mixing members having facing surfaces which extend away from the axis and which define a mixing chamber therebetween;

means for rotating at least one of the mixing members to provide relative rotation between the first and second mixing members in a first rotational direction;

an array of mixing formations on at least one of said surfaces which interact to mix material within the mixing chamber and which are configured to provide a net propulsion of material within the mixing chamber towards the axis as the first and second members are relatively rotated in said first rotational direction; and wherein an axial portion of at least one of the first and second mixing members is removable to permit discharge of material from the mixing chamber as the mixing members are rotated in said first rotational direction.

The mixing formations are preferably indentations such as grooves and/or protuberances formed in/on each of the surfaces.

As with the first aspect of the invention, non-planar mixing surface geometries are advantageous and it is preferred that the first mixing member is concave and the second mixing member is convex, the mixing members nesting within one another to define said mixing chamber therebetween.

Preferably the removable portion is a central portion of the first mixing member. The removable portion of the or each mixing member may for instance comprise a plug which is insertable into a respective aperture in the or each mixing member. Preferably each of the first and second mixing members is provided with an aperture as its centre, and a single plug is provided for plugging both apertures.

The present invention also provides a method of mixing a material in a mixing apparatus comprising a mixing chamber defined between facing surfaces of first and second opposing mixing members which are relatively rotatable to one another about an axis, the facing surface of at least the first mixing member having an array of mixing formations which interact with the facing surface of the second mixing member to mix material within the mixing chamber as the first and second mixing members are relatively rotated, the number of mixing formations on at least one of the surfaces increasing with radial distance from the axis, at least some of the mixing formations being configured to propel material within the mixing chamber towards or away from the axis dependent upon the direction of relative rotation of the first and second mixing members, the method comprising relatively rotating the first and second mixing members in a direction such that said mixing formations interact to propel material towards said axis.

Specific embodiments of the present invention will now be described, by way of example only, with reference to the accompanying drawings, in which.

Figure 1:
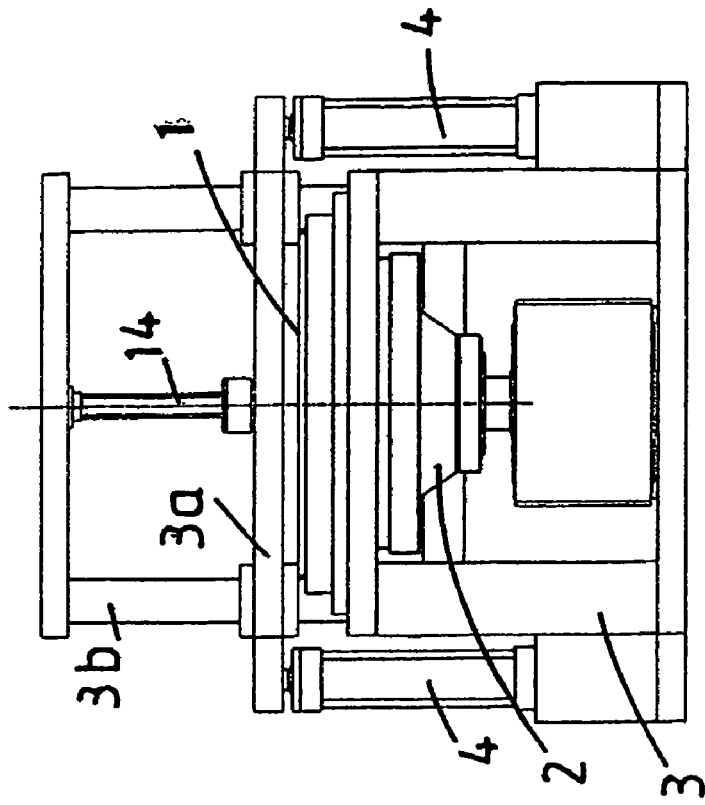
FIG. 1 is a front view of a high shear mixer in accordance with the present invention.
Figure 2:
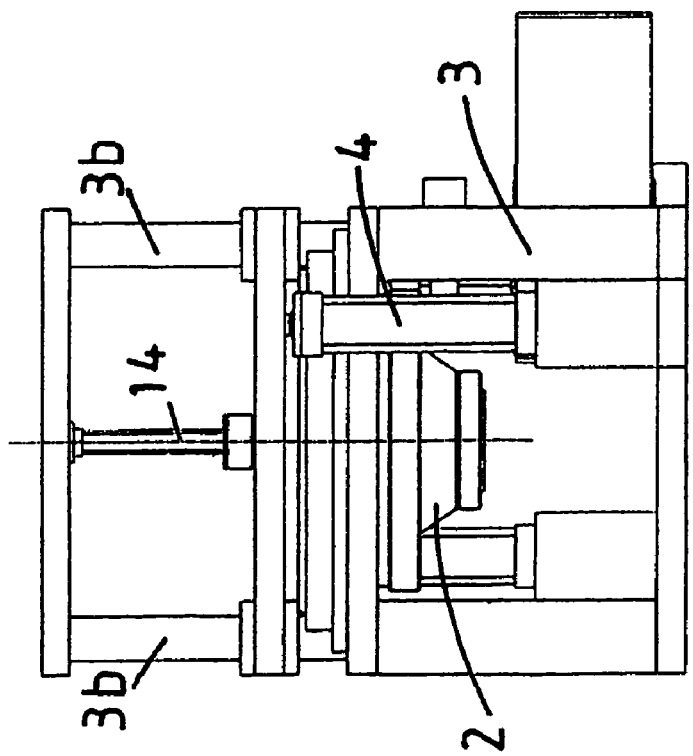
FIG. 2 is a side view of the mixer of FIG. 1 looking in the direction of arrow A of FIG. 1.
Figure 3:
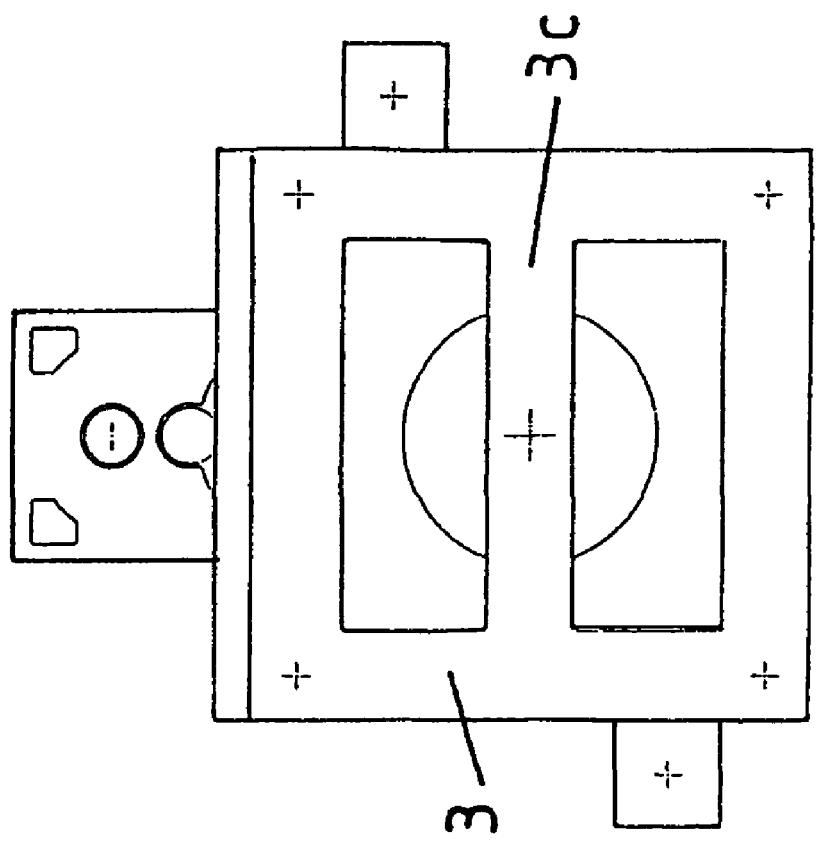
FIG. 3 is a plan view of the mixer of FIGS. 1 and 2.
Figure 4:
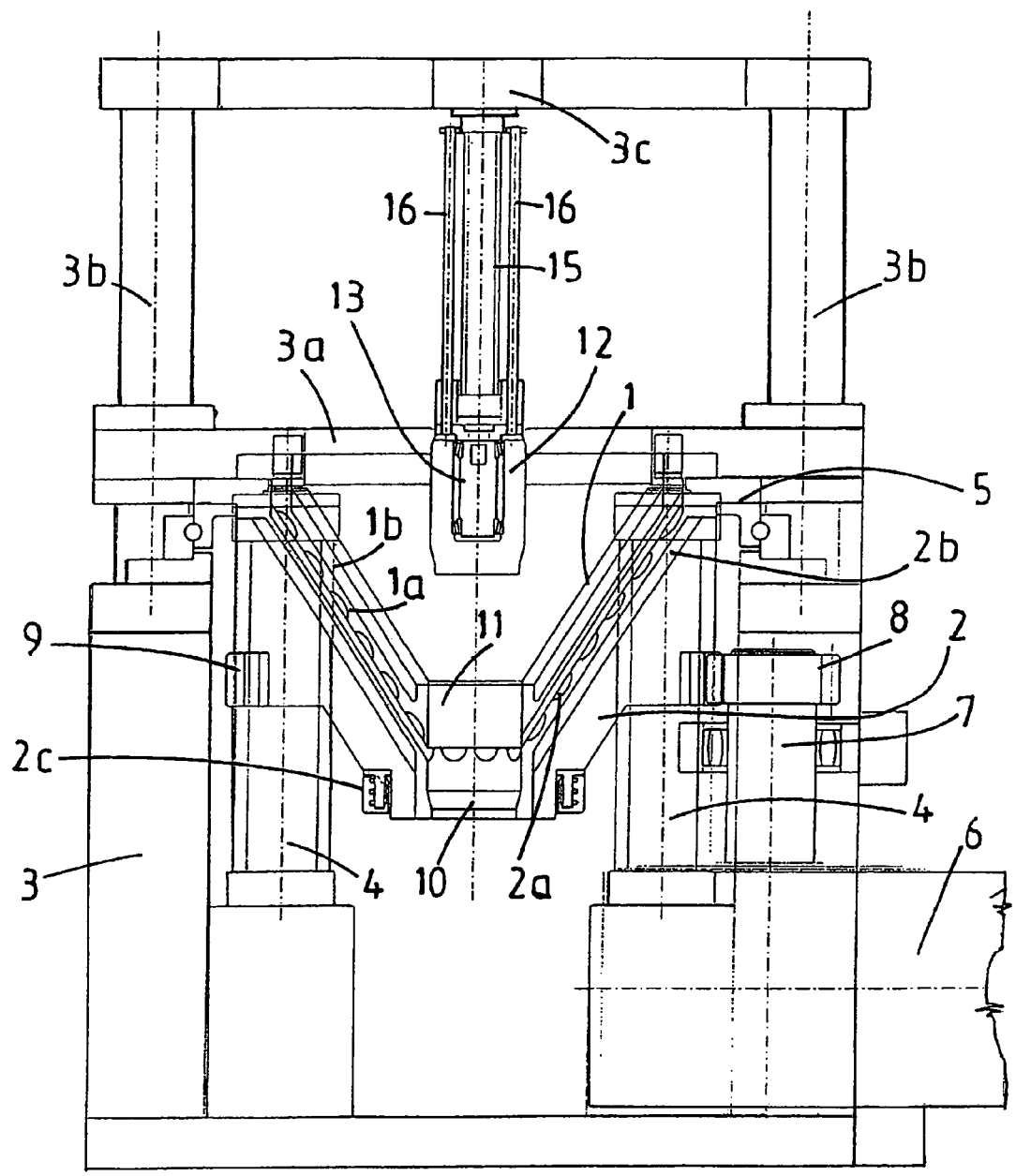
FIG. 4 is an enlarged and part sectioned side view of the mixer corresponding to FIG. 2 but showing hidden detail.
Figure 5B:
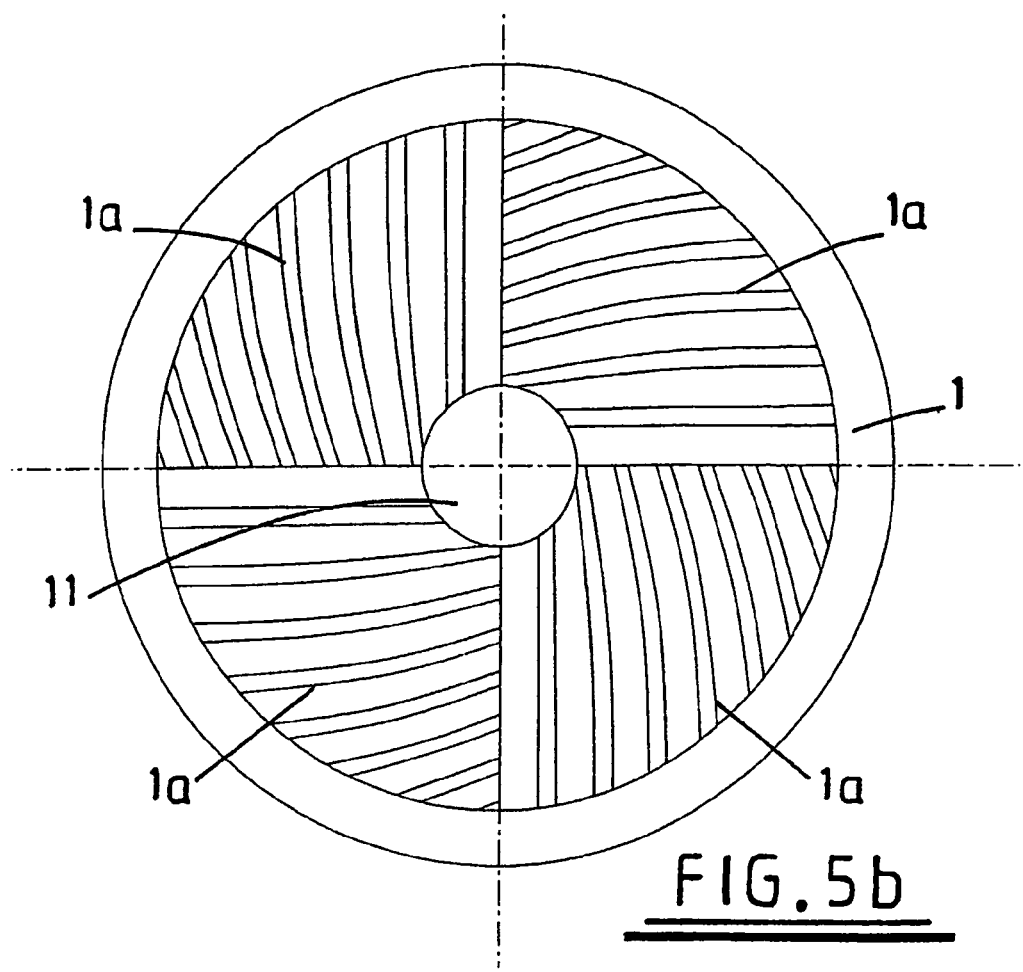
FIGS. 5a and 5b are side and plan views respectively of the stator of the mixer of FIGS. 1 to 4 (not to scale)
Figure 5A:
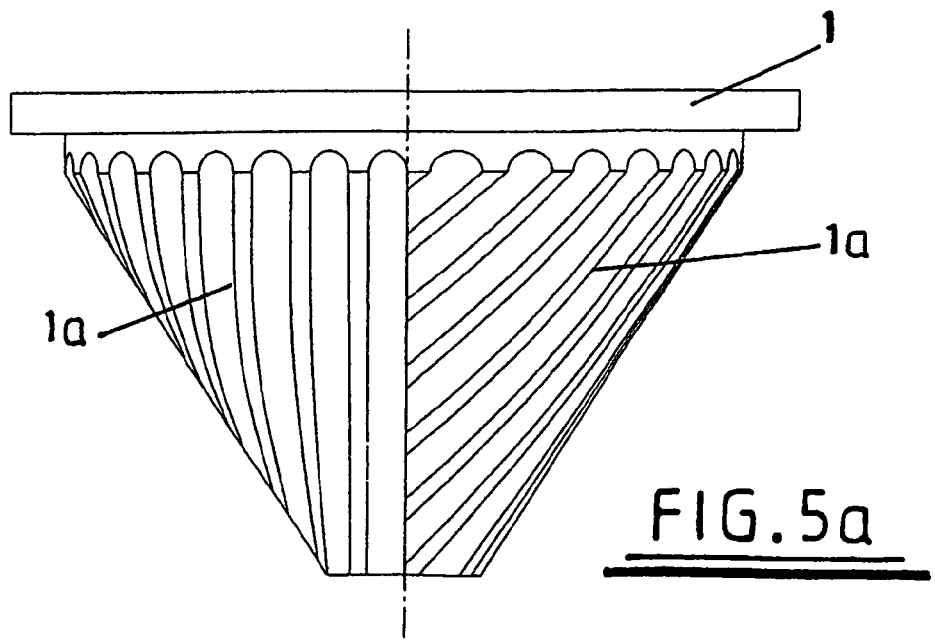

Referring to the drawings, the illustrated mixer is a batch HSM mixer comprising conically nested upper and lower mixing members 1 and 2 supported by upper and lower sections respectively of a fixed support frame 3. The upper mixing member 1 is a conically convex stator supported by cross members 3a of the upper section of the support frame 3. The cross members 3a are slidably supported on four frame columns 3b and hydraulic rams 4 are provided for raising and lowering the stator 1 as will be described further below. The conical outer surface of the stator 1 is provided with an arrangement of grooves 1a (best seen in FIGS. 5a and 5b). The stator has a double-wall structure defining an internal coolant channel 1b.

The lower mixing member 2 is a conically concave rotor mounted for rotation about its central axis on an annular slew-ring bearing 5 supported by the lower section of the support frame 3. The rotor 2 has an arrangement of grooves 2a formed on its inner surface which in use co-operate with the grooves 1a formed on the stator as will be described further below. Similar to the stator 1, the rotor 2 is a double-wall structure defining an internal coolant channel 2b which receives coolant via a rotary union 2c. The rotor 2 is driven by a suitable motor (not shown) via a gear box 6 and gear shaft 7 provided with a pinion gear 8 which engages an annular gear wheel 9 mounted around the outer circumference of the rotor 2.

Corresponding apertures 10 and 11 are formed at the apex of both the rotor 2 and stator 1 respectively which align with one another along the axis of rotation of the rotor 2. A plug 12 provided for selectively plugging/unplugging the apertures 10 and 11 is rotatably mounted on a spindle 13, on bearings 14, which projects downwardly from a hydraulic cylinder 15 which is supported above the stator 1 on a cross member 3c of the upper section of the support frame 3. The plug 12 is generally cylindrical and has an outer surface which corresponds to the contours of the inner surfaces of the apertures 10 and 11. In use a lower portion of the plug 12 engages the rotor 2 within the aperture 10 so that the plug 12 rotates with the rotor 2. Guide rods 16 are provided to prevent the cylinder 15 rotating with the plug 12.

Figure 6A:
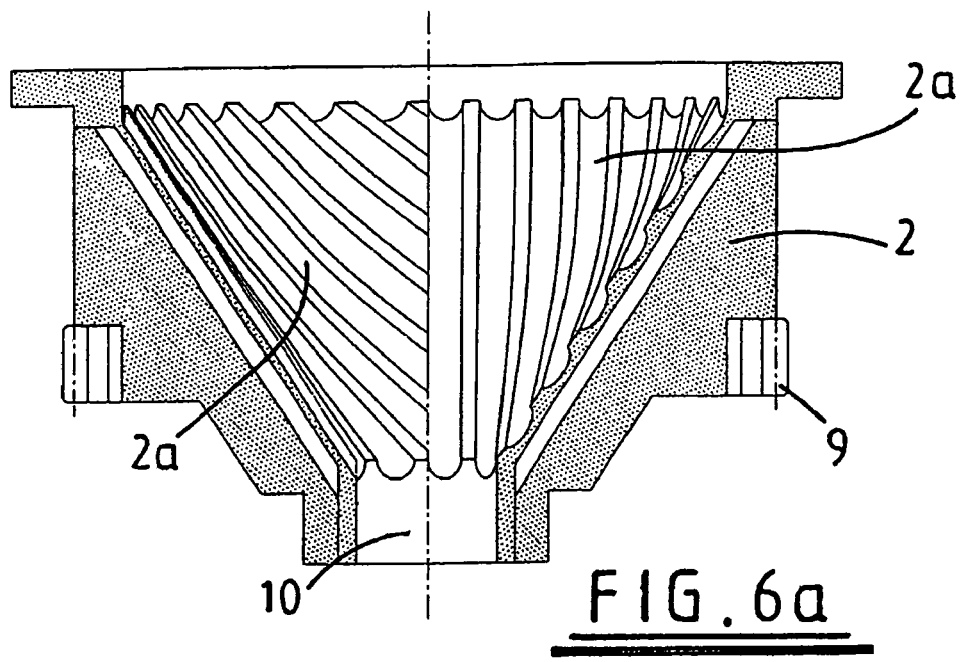
FIGS. 6a and 6b are respectively a cross-section side view and plan view of the rotor of the mixer of FIGS. 1 to 4 (not to scale)
Figure 6B:
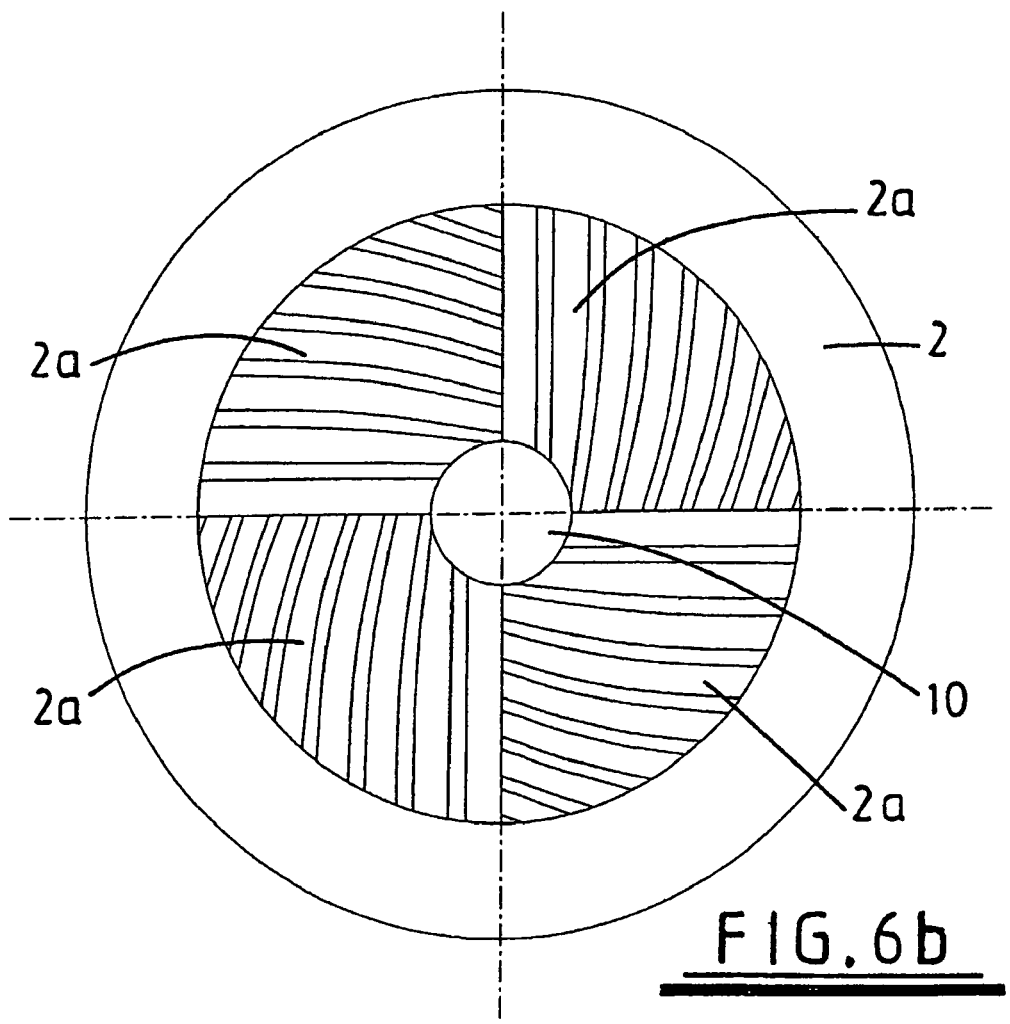

The arrangement of the grooves 1a and 2a formed in the opposing surfaces of the stator 1 and rotor 2 respectively are best seen from FIGS. 5 and 6. The pattern of grooves is essentially the same on each of the rotor and stator. In each case the grooved surface is divided into four sectors (quadrants) by imaginary radial lines projected on to the surface and extending from the axis to the outer periphery of the respective member. In each quadrant eight grooves 1a/2a extend from spaced apart locations along one of the radial lines defining that quadrant to similarly spaced apart locations at the outer periphery of the rotor/stator. The grooves of each quadrant are generally parallel to one another and to a radial line projected on to the surface of rotor/stator. Since all of the grooves extend to the outer periphery of the surface of the rotor/stator (i.e. the maximum diameter portion of the conical members) but not all of the grooves extend to the centre (apex), the number of grooves defined in the surface effectively increases with the diameter of the stator/rotor. Operation of the mixer will now be described with particular reference to FIGS. 7a to 7d.

Figure 7A:
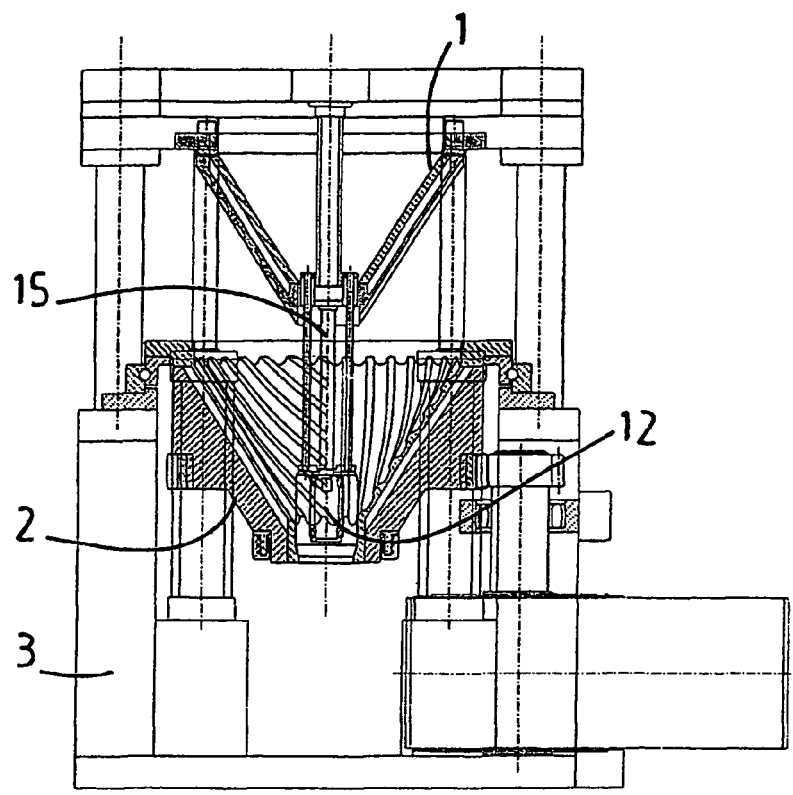
FIGS. 7a to 7d illustrate four stages in the operation of the mixer of FIGS. 1 to 4.
Figure 7B:
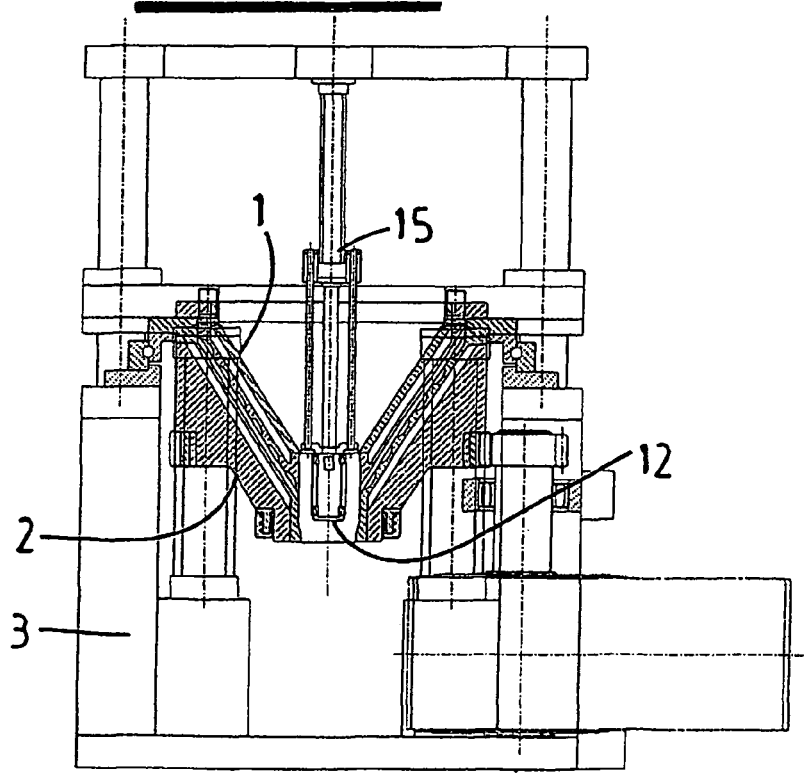

To load material into the mixer, the stator 1 is raised by the hydraulic rams 4 whilst the plug 12 is held in a lowered position in engagement with the aperture 10 in the rotor 2, as illustrated in FIG. 7a. This enables material to be introduced directly into the interior of the conically concave rotor 2. The stator 1 is then lowered so that it nests within the rotor 2 and the upper portion of the plug 12 is received within the aperture 11. An appropriate gap is left between the grooved surfaces of the rotor 2 and stator 1 to define the mixing chamber. The rotor 2 is then rotated to perform a mixing operation.

In essence the mixing mechanism is the same as that described in relation to the original mixer geometry proposed by William Watson as disclosed in UK patent number 2,300, 129 mentioned above. At certain relative rotational orientations the grooves 1a in the stator will align with the grooves 2a in the rotor so that material present in the mixing chamber is squeezed into the opposing grooves. As the rotor 2 and stator then rotate relative to one another the grooves 1a and 2a are brought out of register with one another so that there is a progressive transfer of the material from the grooves into the smaller spaces defined between the lands defined between the grooves of one of the rotor and stator and the opposing lands defined between the grooves of the other of the rotor stator. The material is thus extended and sheared which induces the mechanochemical reactions.

In addition, there is a scissioning action as the grooves 1a cross grooves 2a which contributes both to the shearing and splitting of the material within the mixing chamber. Mixing thus occurs both between and within the grooves. Moreover, the grooves are orientated so that the scissioning action will tend to propel the material either towards the centre or the periphery of the mixing chamber depending upon the direction of that rotation, thereby enhancing distributive mixing. In particular, by rotating the rotor so that material is propelled towards the centre of the mixing chamber material will be continually radially circulated within the mixing chamber as the pressure of the material builds up towards the centre so that it backflows towards the periphery of the mixer. However, if there is any tendency for the material to stagnate towards the centre of the mixing chamber, i.e. at the apex of the conical mixing members, this can be countered by periodic reverse rotation of the rotor 2.

A significant advantage in the mixing mechanism provided by the present invention is that by relating the number of grooves available for mixing material to the radius of the rotor/stator, so that the number of grooves increases with increasing distance from the axis of rotation, it is possible to normalize the shear, extension and scissioning actions so that material at all positions within the chamber is subjected to substantially the same mixing actions. This enables the mixing of material to be kept substantially uniform throughout the mixing chamber as the size of the mixer is scaled up.

Figure 7C:
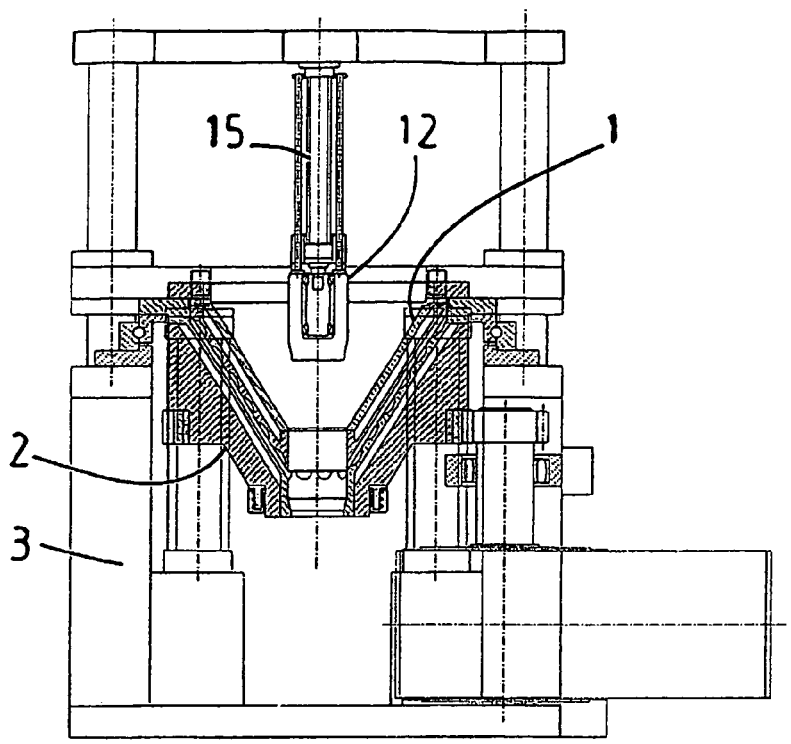
Figure 7D:
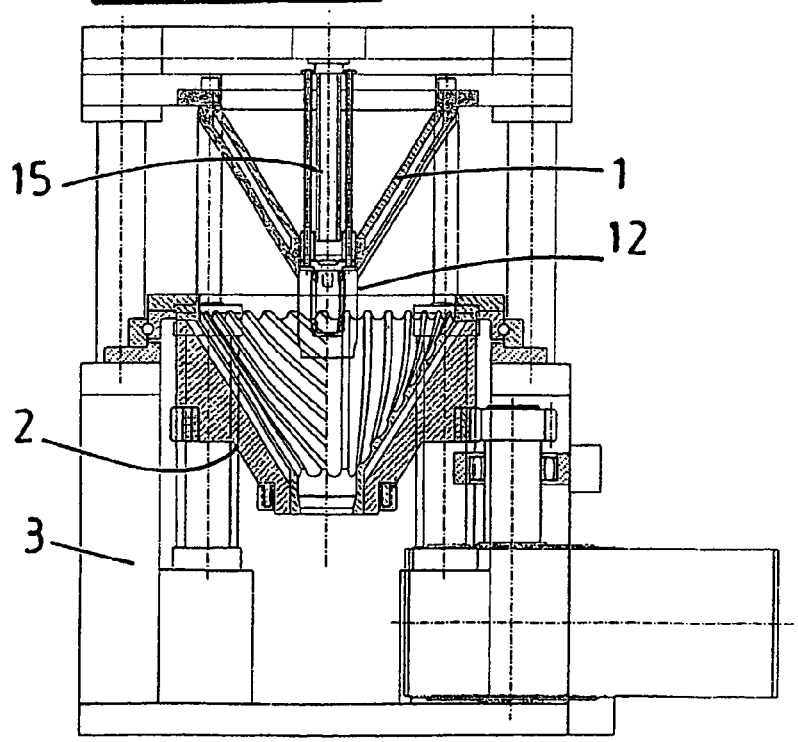

At the end of the mixing process the plug 12 is raised whilst the stator 1 is maintained in its lowered position as shown in FIG. 7c, and the rotor 2 is further rotated to pump the mixed material for discharge through the aperture 10 at the apex of the rotor 2. The stator 1 is then raised as shown in FIG. 7d so that any residual material present can be manually evacuated. The plug 12 can then be lowered once again into the position shown in FIG. 7a for a subsequent mixing operation.

It will be appreciated that the arrangement of grooves to provide uniform mixing across the mixing chamber may be applied to substantially planar mixing members, such as opposing discs. Accordingly, modifications of the present invention may incorporate such planar rotors and stators rather than the conical members disclosed. Similarly, disc shaped mixing members could be provided with a central plug to facilitate discharge of mixed material in essentially the same way as described above. However, the adoption of conical members provides further significant advantages over the prior art geometry.

Firstly, by adopting a conical geometry the maximum diameter of the mixing members can be minimized in relation to the required mixer volume, surface area and surface speed. Thus, a relatively large mixer can be provided without the problems associated with over stressing material towards the periphery of the mixing members due to high rotational speeds. In addition, the torque and thus power requirements to rotate the rotor are reduced in comparison to a planar geometry of similar surface area/volume. Large volumes of material can therefore be mixed in a relatively compact mixer without the need to provide disadvantageously deep grooves. The conical geometry is also useful in retaining liquid within the mixer which aids effective distributive mixing. In addition, gas retention within the cone can provide effective mixing within alternative (e.g. non-oxygenated) environments.

Furthermore, by adopting different cone angles it is possible to establish different shear and extension intensities as a function of distance from the axis of rotation providing further control over the mixing mechanisms by appropriate design of the mixing members.

It will be appreciated that it is not necessary for the mixing members to be strictly conical to achieve the above advantages. Alternatives include any geometry in which the circumference of the surface reduces along a central axis of the surface and thus for instance would include domed and trumpet shaped geometries.

It will also be appreciated that the exact pattern of grooves could be varied significantly. A relatively simple modification of the groove arrangement described above would be to divide the surface into more than four sectors, each sector having a similar arrangement of grooves to those provided in the quadrants of the embodiment described above. The feature which provides uniform or substantially uniform mixing across the whole mixing chamber is the provision of an increasing number of grooves with distance from the axis of rotation. For instance it is not necessary for all grooves to extend to the outer peripheral edge of the rotor/stator, nor is it necessary for the pattern of grooves to be identical on both the rotor and stator.

Similarly the configuration of the individual grooves could vary. For instance as mentioned above the grooves could be provided with a cross-section which increases with radius to enhance the distributive mixing.

Moreover, the mixing surfaces may be provided with protuberances such as raised edges rather than grooves but which may be similarly patterned to provide the required mixing actions and propulsion of material towards or away from the axis of rotation. Embodiments of the invention may include a combination of both grooves (or other indentations) and such protuberances.

The advantageous provision of a removable plug at the centre of the rotor/stator, and many of the advantages gained from the conical (or similar) geometry, are independent of the nature of the grooves and could be applied to a groove geometry as previously proposed in British patent number 2,300, 129. Accordingly, mixers embodying certain selected aspects of the present invention include mixers having substantially the same geometry as disclosed in British patent 2,300,129 but with a removable central plug and/or a conical geometry.

It will also be appreciated that whilst the embodiment of the invention described above has been designed primarily for the de-vulcanization of cross-linked visco-elastic materials, such as re-claimed rubber, it is not limited to this application and can be applied anywhere that high shear mixing is desirable, for instance in the compounding or otherwise processing of other polymeric materials such as rubber, thermoplastics and thermosets, or in the processing of doughs, pastes, slurries and fluids. The invention has application in most areas of processing industries in which liquids, solids and combinations of the two are required to be subjected to distributive and or dispersive mixing actions. Such processing industries include but are not limited to chemicals, petrochemicals, polymers, foods, beverages, pharmaceuticals, personal care products, home care products, water, sewerage, waste, energy and recycling.

Other possible modifications and applications of the present invention will be readily apparent to the skilled person.

The invention claimed is:

1. A batch mixing apparatus comprising:
   first and second opposing mixing members rotatable relative to one another about an axis;
   said first and second mixing members having facing surfaces which extend away from the axis and which define a mixing chamber therebetween closed to prevent discharge during mixing;
   means for rotating at least one of the mixing members to provide relative rotation between the first and second mixing members in a first rotational direction;
   an array of mixing formations on at least one of said surfaces which interact to mix material within the mixing chamber and which are configured to propel material within the mixing chamber towards the axis as the first and second members are relatively rotated in said first rotational direction; and
   wherein the number of mixing formations on at least one of the surfaces increases with radial distance from the axis.

2. A mixing apparatus according to claim 1 wherein an axial portion of at least one of the first and second mixing members is removable to permit discharge of material from the mixing chamber through a discharge port by relative rotation of at least one of said first and second mixing members in said first rotational direction.

3. A mixing apparatus according to claim 1, wherein the mixing formations are indentations.

4. A mixing apparatus according to claim 3, wherein the indentations are grooves.

5. A mixing apparatus according to claim 4, wherein the grooves define a cross-sectional area that increases with radial distance from the axis.

6. A mixing apparatus according to claim 1, comprising mixing formations which protrude from the respective surface.

7. A mixing apparatus according to claim 6, wherein the protruding mixing formations are raised edges.

8. A mixing apparatus according to claim 1, wherein at least some of the mixing formations on at least one of the surfaces are swept forwards relative to said first rotational direction to provide said propulsion.

9. A mixing apparatus according to claim 8, wherein at least some of said mixing formations on both surfaces are swept forwards relative to said first rotational direction.

10. A mixing apparatus according to claim 1, wherein each mixing formation on said at least one surface has a radially inner end and a radially outer end relative to said axis, the inner ends of some of the mixing formations on each surface being further away from said axis than other mixing formations on the same surface.

11. A mixing apparatus according to claim 10, wherein the number of mixing formations on a respective surface having inner ends relatively remote from the axis is greater than the number of mixing formations on the same surface having inner ends relatively close to the axis.

12. A mixing apparatus according to claim 10, wherein the outer end of each mixing formation terminates at the radially outer periphery of the respective surface.

13. A mixing apparatus according to claim 10, wherein said at least one surface is divided into two or more sectors, each sector having an array of substantially parallel mixing formations, the mixing formations of one sector being non-parallel to the mixing formations of at least one other sector.

14. A mixing apparatus according to claim 13, wherein the mixing formations within a particular sector are substantially parallel to a radial line projected on the respective surface.

15. A mixing apparatus according to claim 1, wherein said at least one surface is divided into radially inner and outer regions, each region defining mixing formations which start and finish within that region, wherein radially outer regions have more mixing formations than radially inner regions.

16. A mixing apparatus according to claim 1, wherein all of the mixing formations on said at least one surface are substantially parallel to one another and parallel to a radial line projected on the surface.

17. A mixing apparatus according to claim 1, wherein both of said surfaces have mixing formations which increase in number with distance from said axis.

18. A mixing apparatus according to claim 1, wherein the said surface of the first mixing member is concave and the said surface of the second mixing member is convex.

19. A mixing apparatus according to claim 18, wherein the surfaces of the first and second mixing members are conical or frusto-conical and taper towards said axis.

20. A mixing apparatus according to claim 1, wherein said surfaces of the first and second mixing members are substantially planar.

21. A mixing apparatus according to claim 2, wherein the removable portion of the or each mixing member comprising a plug which is insertable into a respective aperture in the or each mixing member.

22. A mixing apparatus according to claim 21, wherein each of said first and second members is provided with an aperture at its respective center, and a single plug is provided for plugging both apertures.

23. A mixing apparatus according to claim 22, wherein the first and second mixing members are supported by a support frame with the second member mounted above the first member, and said plug is supported on a moveable member extending above the second mixing member for insertion into and removal from said apertures in said mixing members.

24. A mixing apparatus according to claim 23, wherein means are provided for raising the second member whilst said plug is maintained in engagement with the first mixing member to facilitate loading of material to be mixed into the mixing chamber.

25. A mixing apparatus according to claim 21, wherein only one of said first and second mixing members is rotatable, and wherein said plug is rotatably mounted to an extendable member and adapted to engage the rotatable mixing member for rotation therewith.

26. A mixing apparatus according to claim 2 wherein said removable portion is removable whilst at least one of the first and second mixing members are relatively rotated in a direction to pump material out of the mixing chamber through an aperture left open by removal of the removable portion.

27. A mixing apparatus according to claim 26, wherein means are provided for raising the second mixing member whilst the removable portion is maintained out of engagement with the first mixing member to facilitate manual removal of mixed material.

28. A mixing apparatus according to claim 1, wherein both of said first and second mixing members are counter-rotatable.

29. A mixing apparatus according to claim 1, wherein means are provided for selective relative rotation of said first and second mixing members in a second rotational direction opposite to said first rotational direction to reverse the direction of propulsion of material within the mixing chamber away from said axis.

30. A mixing apparatus comprising:
first and second opposing mixing members rotatable relative to one another about an axis;
said first and second mixing members having facing surfaces which extend away from the axis and which define a mixing chamber therebetween;
means for rotating at least one of the mixing members to provide relative rotation between the first and second mixing members in a first rotational direction; and
an array of mixing formations on at least one of said surfaces which interact to mix material within the mixing chamber and which are configured to provide a net propulsion of material within the mixing chamber towards the axis as the first and second members are relatively rotated in said first rotational direction;
said mixer including a discharge port
wherein an axial portion of at least one of the first and second mixing members in a first position prevents flow through the discharge port and is removable to permit discharge through said discharge port of material from the mixing chamber as the mixing members are rotated in said first rotational direction.

31. A mixing apparatus according to claim 30, wherein said first mixing member is concave and said second mixing member is convex, the mixing members nesting within one another to define said mixing chamber therebetween.

32. A mixing apparatus according to claim 30, wherein said surfaces of the first and second mixing members are substantially planar.

33. A mixing apparatus according to claim 30, wherein said removable portion is a central portion of the first mixing member.

34. A mixing apparatus according to claim 30, wherein the removable portion comprises of the or each mixing member comprises a plug which is insertable into a respective aperture in the or each mixing member.

35. A mixing apparatus according to claim 34, wherein each of the first and second mixing members is provided with an aperture as its centre, and a single plug is provided for plugging both apertures.

36. A mixing apparatus according to claim 35, wherein the first and second mixing members are supported by a support frame with the second member mounted above the first member, and wherein said plug is supported on a moveable member extending above the second mixing member for insertion into and removal from said apertures in said mixing members.

37. A method of mixing a batch of material in a mixing apparatus comprising a mixing chamber defined between facing surfaces of first and second opposing mixing members which are relatively rotatable to one another about an axis, the facing surface of at least the first mixing member having an array of mixing formations which interact with the facing surface of the second mixing member to provide a propulsion of material within the mixing chamber as the first and second mixing members are relatively rotated, the number of mixing formations on at least one of the surfaces increasing with radial distance from the axis, at least some of the mixing formations being configured to propel material within the mixing chamber towards or away from the axis dependent upon the direction of relative rotation of the first and second mixing members, the method comprising opening the mixing chamber adding materials to be mixed to the mixing chamber, closing the mixing chamber relatively rotating the first and second mixing members in a direction such that said mixing formations interact to provide continuous radial circulation propelling material towards said axis, said relative rotation continuing until desired mixing is obtained and then discharging the mixed material from the mixing apparatus.

38. The method of claim 37 wherein the mixing apparatus further includes a discharge port in said mixing apparatus, said discharge port being sealed during mixing to prevent discharge of the material from the mixing apparatus during the mixing operation and openable upon completion of mixing to discharge the contents of the mixing apparatus.

* * * * *

UNITED STATES PATENT AND TRADEMARK OFFICE
CERTIFICATE OF CORRECTION

PATENT NO. : 7,461,970 B2  
APPLICATION NO. : 10/503566  
DATED : December 9, 2008  
INVENTOR(S) : Brown It is certified that error appears in the above-identified patent and that said Letters Patent is hereby corrected as shown below:

- Column 11, Line 11, is written as: "chamber adding materials to be mixed to the mixing chamber," should read: "chamber, adding materials to be mixed to the mixing apparatus chamber,"

- Column 11, Line 12, is written as: "closing the mixing chamber relatively rotating the first and" should read: "closing the mixing chamber, relatively rotating the first and"

- Column 12, Line 3, is written as: "propelling material towards said axis, said relative rotation" should read: "propelling material towards and away from said axis, said relative rotation"

Signed and Sealed this

Seventeenth Day of November, 2009

David J. Kappos  
*Director of the United States Patent and Trademark Office*